(12) United States Patent
Aoyama et al.

(10) Patent No.: US 6,810,200 B1
(45) Date of Patent: Oct. 26, 2004

(54) DIGITAL DATA PROCESSING DEVICE THAT RESTRICTS USAGE OF DATA PRESENT ON A RECORDING MEDIUM

(75) Inventors: Shoichi Aoyama, Hirakata (JP); Yukie Syoda, Moriguchi (JP); Kenichi Koshiba, Takatsuki (JP); Yukako Ohtani, Moriguchi (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/548,625

(22) Filed: Apr. 13, 2000

(30) Foreign Application Priority Data

Apr. 14, 1999 (JP) ............................................. 11-106771

(51) Int. Cl.[7] ............................. H04N 5/91; G11B 3/64; H04L 9/00

(52) U.S. Cl. ............................. 386/94; 369/84; 705/57; 705/58

(58) Field of Search .............................. 360/60; 369/84, 369/85; 380/201, 203, 202; 386/94; 705/51, 52, 56, 57, 58; H04N 5/91; G11B 3/64; H04L 9/00

(56) References Cited

U.S. PATENT DOCUMENTS

| | | | |
|---|---|---|---|
| 5,315,448 A | * | 5/1994 | Ryan ........................... 386/124 |
| 5,666,411 A | * | 9/1997 | McCarty ....................... 705/51 |
| 5,907,443 A | * | 5/1999 | Hirata .......................... 386/94 |
| 6,073,123 A | * | 6/2000 | Staley .......................... 705/58 |
| 6,618,335 B2 | * | 9/2003 | Tanaka et al. ................. 705/57 |

* cited by examiner

Primary Examiner—Vincent Boccio
Assistant Examiner—James A Fletcher
(74) Attorney, Agent, or Firm—Wenderoth, Lind & Ponack, L.L.P.

(57) ABSTRACT

A digital data recording control system reads music data from a CD and records (i.e., copies) the music data onto an SD card. The CD also stores an ISRC that specifies the content of the CD, that is, the music data present on the CD. The digital data recording control system includes: a recording number information storage unit for associating the ISRC with a number of times the music data has been recorded onto an SD card; a limit information storage unit for storing information showing a limit on a number of times the music data is permitted to be recorded; and a record judging unit for: (1) having a digital data reading unit read the ISRC from the CD and, if a number of times associated with the read ISRC is lower than the limit, read the music data from the CD; and (2) having a recording unit convert the read music data into an MP3 format and record the converted music data onto the SD card.

18 Claims, 5 Drawing Sheets

| ISRC (130, 131) | NUMBER OF RECORDINGS (132) |
|---|---|
| JPXXX0012345 | 1 |
| USXXX9913524 | 3 |
| JPZZZ9901375 | 2 |

FIG. 5

| ISRC (150, 151) | LIMIT ON THE NUMBER OF RECORDINGS (152) |
|---|---|
| JPXXX0012345 | 2 |
| UKYYY9900205 | 2 |
| USXXX9913524 | 3 |
| JPZZZ9901375 | 2 |
| JPYYY0012078 | 1 |

DIGITAL DATA PROCESSING DEVICE THAT RESTRICTS USAGE OF DATA PRESENT ON A RECORDING MEDIUM

This application is based on application No. 11-106771 filed in Japan, the content of which is hereby incorporated by reference.

BACKGROUND OF THE INVENTION

(1) Field of the Invention

The present invention relates to a technique to protect a copyright on a digital production and more specifically to a technique to restrict use of digital data, such as music, stored on a recording medium such as a compact disc (CD), based on the number of times the digital data has been used. Here, to "use" digital data on a CD means to read the data from the CD, reproduce the data, or record the data onto another recording medium.

(2) Description of the Prior Art

The widespread use of personal computers (PCs) and developments in Internet technology have enabled digital data, such as music and computer programs, to be widely distributed and used.

For instance, the MP3 JUKEBOX application program developed by SUMITOMO METAL Systems Development Co., Ltd. allows the user to freely create a copy of music digital data written on a CD, using a PC. According to this application program, music digital data written on a CD is read and compressed into a small-sized MP3 (MPEG1 Audio Layer-3) format, which is one of compression formats standardized by MPEG (Moving Picture Experts Group) for audio data. By compressing a large amount of data, such as music, into a small amount of data according to MP3, which performs irreversible compression at a high compression rate, the data can be quickly distributed via a communication line whose band width is small, or written onto a small-capacity recording medium.

As another example of technology contributing to widespread use of digital data, portable music playback devices, such as RIO developed by Diamond Multimedia Systems, Inc., which play music data in an MP3 format present on flash memory, have appeared on the market.

The following briefly describes a digital data recording system that uses the MP3 JUKEBOX application program.

Figure 1:
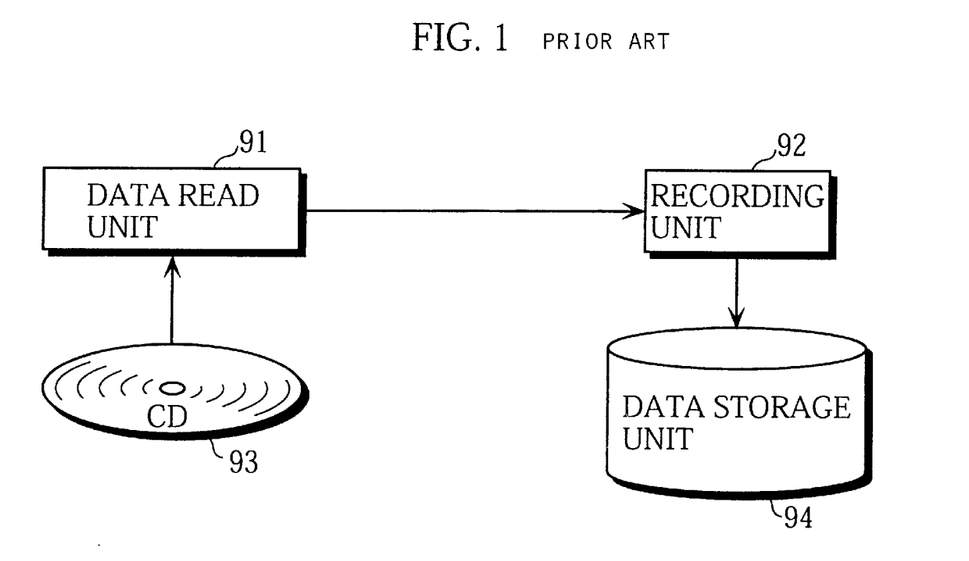
FIG. 1 is a block diagram showing functional components of a conventional digital data recording system.

FIG. 1 is a block diagram showing functional components of the conventional digital data recording system.

This digital data recording system can be achieved by a PC that comprises a CPU, memory, a reader that reads a digital signal from a CD, and storage such as a hard disk unit. In terms of functions, this system comprises a data read unit 91, a recording unit 92, and a data storage unit 94.

The data read unit 91 reads music digital data stored on a CD 93, and the recording unit 92 converts the read data into an MP3 format and places it into the data storage unit 94, which is a recording medium such as a hard disk. Functions of the data read unit 91 and the recording unit 92 can be realized by the CPU executing the application program stored in the memory.

The user can use the digital data, which has been stored in the data storage unit 94, for instance, by having an application program that controls music reproduction process the digital data, or recording it into flash memory in the aforementioned portable music record/playback device after connecting this record/playback device to the PC.

However, the above digital data recording system, which does not have the provision for restricting creation of a copy of digital data, has a drawback in that copyrights of digital productions cannot be protected.

Serial Copy Management System (SCMS) is a scheme to protect copyrights of digital productions by preventing digital data from being repeatedly copied. SCMS is built into an audio appliance which has a function to create a copy of digital data, including music, which is written on a recording medium such as a CD, and to transfer the copy onto another writable recording medium such as a Mini Disc (MD). Such an audio appliance with the SCMS built in can prevent a first-generation copy recorded by the user on an MD or the like from being copied again, that is, prevent a second- or higher-generation copy from being created.

However, SCMS does not prevent users from making numerous first-generation copies. This means that implementing SCMS in devices that can copy digital data from one medium such as a CD onto another does not stop users of such devices from making any number of first-generation copies that may end up being distributed illegally.

SUMMARY OF THE INVENTION

In view of the above problems, the present invention aims to provide a digital data processing device that restricts creation of a first-generation copy of digital data, such as music, present on a recording medium such as a CD, based on the number of times the digital data has been copied.

Since digital data is used in a variety of ways, the present invention also aims to provide a digital data processing device which restricts usage, other than just copying, of digital data present on a recording medium, based on a number of times the digital data has been used.

In order to achieve the above objects, the digital data processing device of the present invention (1) reads content data from a first recording medium which also stores ID (identification) information, and (2) uses the read content data, the digital data processing device including: a limit information storage unit for storing limit information showing a limit on a number of times the content data is permitted to be used: a use information storage unit that has a storage region capable of storing a combination of: (1) the ID information present on the first recording medium; and (2) use information showing a number of times the content data has been used; an ID information reading unit for reading the ID information from the first recording medium; a use judging unit for: (1) referring to the use information storage unit to obtain the use information that is in the same combination as the read ID information; (2) comparing the number of times in the obtained use information with the limit in the limit information; and (3) judging whether usage of the content data is permitted based on a comparison result; and a content data using unit for using the content data if the use judging unit has judged that the usage of the content data is permitted, and updating the use information each time the content data is used.

With the above construction, the digital data processing device associates a number of times content data present on a recording medium has been used with ID information, which is also present on the recording medium, as one combination. The digital data processing device then judges whether to permit usage of the content data based on this number of times to restrict usage of the content data. Accordingly, the present invention can be used to protect benefits of copyright holders of productions.

Since the above combination, based on which the above judgement is made, is stored in a storage region, not on the first recording medium, the first recording medium does not need to have a space for storing information such as for the combination. This also enables the present digital data processing device to restrict usage of content data present on a read-only medium.

Here, the content data using unit may contain a recording unit that accesses a second recording medium to write data, and uses the content data by having the recording unit write the content data onto the second recording medium.

The above digital data processing device can restrict recording, that is, copying of content data present on one recording medium onto another, based on a number of times the content data has been copied. This can prevent users from making numerous first-generation copies of music, for instance, stored on a recording medium such as a CD.

Here, the ID information stored on the first recording medium may specify the content data present on the first recording medium.

The above digital data processing device can restrict creation of certain content data based on a number of times the content data has been used regardless of a recording medium on which the content data is present. This allows, for instance, a copyright holder to control a permitted number of copies of content data.

Here, when the read ID information does not exist in the use information storage unit, the use judging unit may (1) assume that use information, which would be in a same combination as the read ID information, shows a number of times0, and (2) obtain the use information showing the number of times0, and the content data using unit may place, instead of performing an update, a combination of: (1) the read ID information; and (2) use information, which shows 1 as a number of times the content data has been used, into the use information storage unit.

With the above construction, the digital data processing device can restrict usage of content data, based on a number of times the content data has been used after recording the content data for the first time. Accordingly, when the limit "0", for instance, is set, it is possible to completely prohibit usage of content data.

Here, the limit in the limit information may correspond to the ID information and show the limit on the number of times the content data, which is present on the first recording medium together with the ID information, is permitted to be used, and the use judging unit may compare the number of times in the use information with the limit corresponding to the read ID information, and judge that usage of the content data is permitted when the compared number is smaller than the limit.

With this construction, usage of content data can be restricted according to ID information corresponding to the content data. This is to say, usage of content data can be restricted according to the content of the content data, regardless of a recording medium on which the content data is present.

Here, the use information may be expressed as a number, and the content data using unit may update the use information by incrementing the number by one, and when the incremented number of times has become equal to the limit in the limit information, the content data using unit may delete a combination containing the updated use information from the use information storage unit, and update the limit to0.

This construction prevents sizes of storage regions, which are present in the digital data processing device and are used to store use information, from continuing to increase each time content data on a different recording medium is used.

Here, the first recording medium may be read-only.

For this construction, the digital data processing device can restrict copying of content data, which is present on a read-only medium such as a CD, based on a number of times the content data has been copied.

Here, the content data may be audio data and/or image data.

For this construction, the digital data processing device is capable of preventing users from unrestrictedly making copies of audio data and/or image data present on a recording medium.

Here, the content data may be audio data, and the first recording medium may be a compact disc. The ID information may be an ISRC (International Standard Recording Code).

For this construction, the digital data processing device is capable of restricting recording of certain music specified by an ISRC onto a recording medium, based on a number of times the content data has been recorded.

Here, the ID information present on the first recording medium may distinguish the first recording medium from other recording media.

With this construction, the digital data processing device is capable of restricting, for each recording medium, a number of times content of the recording medium can be recorded onto another medium.

Here, the content data may be divided into a plurality of sets of partial content data, and the ID information may contain a plurality of sets of part-ID information, each set of part-ID information specifying a different set of partial content data. The ID information reading unit may read a set of part-ID information specifying a set of partial content data, and the use judging unit may judge whether usage of the set of partial content data specified by the read part-ID information is permitted.

With this construction, the digital data processing device is capable of restricting copying of each song, for instance, present on one recording medium based on a number of times the song has been copied.

Here, the content data may be audio data and/or image data, and the content data using unit may include a reproducing unit that reproduces sounds and/or images from the audio data and/or the image data, and use the content data by having the reproducing unit reproduce sounds and/or images from the content data.

With this construction, the digital data processing device is capable of restricting reproduction of data such as music data present on a recording medium such as a CD by setting a limit on a number of times the music data can be reproduced. This is useful, for instance, for restricting a number of times users can play a sample music CD at no charge.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following describes an embodiment of a digital data processing device according to the present invention with reference to drawings.

Construction

Figure 2:
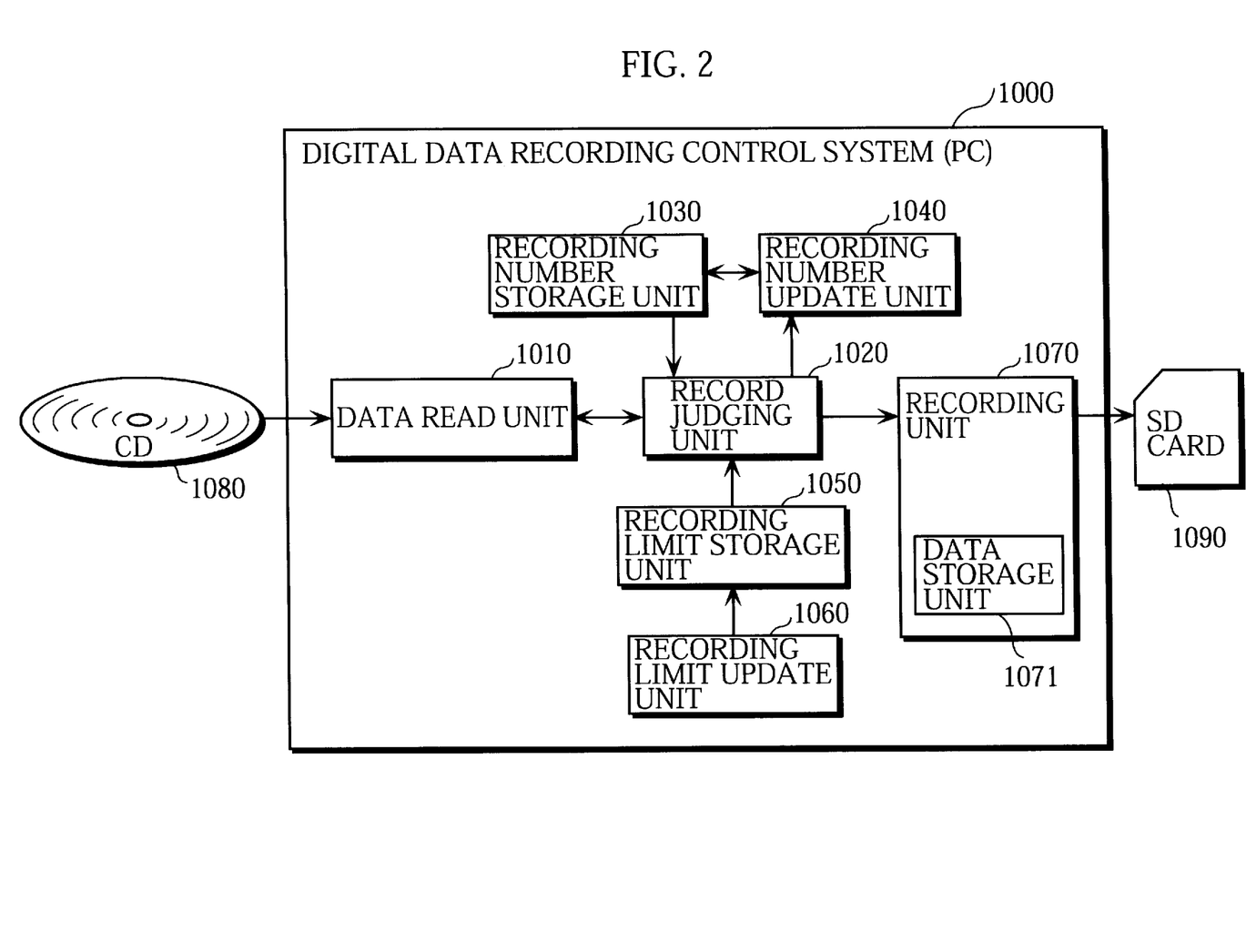
FIG. 2 is a block diagram showing a functional construction of a digital data recording control system 1000 according to the embodiment of the present invention.

FIG. 2 is a block diagram showing a functional construction of a digital data recording control system 1000 of the present embodiment according to the present invention.

The digital data recording control system 1000 reads digital data for music from a CD 1080 and records the digital data onto a Secure Digital (SD) card 1090 while avoiding recording the data more than a predetermined number of times.

The digital data recording control system 1000 is realized by a PC which comprises the following hardware elements: a CPU; memory; a keyboard; a display; a CD reader, such as a CD-ROM drive, that reads a digital signal from the CD 1080; a hard disk unit; and an interface or the like that accesses the SD card 1090. In terms of functions, the digital data recording control system 1000 comprises the 10 following functional elements shown in the figure: a data read unit 1010; a record judging unit 1020; a recording number storage unit 1030; a recording number update unit 1040; a recording limit storage unit 1050; a recording limit update unit 1060; and a recording unit 1070.

The data read unit 1010 controls the CD reader to read an International Standard Recording Code (ISRC) and digital data for music (hereafter music data) from the CD 1080. The ISRC specifies the content of a CD, that is, whole music data stored on the CD. Hereafter, a term "digital data" is used to refer to a combination of an ISRC and music data.

The CD 1080 is a given CD storing music data and is loaded into the CD reader as the input to the digital data recording control system 1000.

The recording number storage unit 1030 is a memory region storing, for the content (i.e., music data) of each CD, a number of times the music data has been recorded onto another recording medium. The recording limit storage unit 1050 is a memory region storing, for the content (music data) of each CD, a limit on the number of times the music data can be recorded onto another recording medium. The power of the PC is assumed to be always on. Information stored in the recording number storage unit 1030 and the recording limit storage unit 1050 is explained later in detail.

The record judging unit 1020 judges from information in the recording number storage unit 1030 and the recording limit storage unit 1050 whether music data can be recorded onto the SD card 1090. In accordance with this judgement result, the record judging unit 1020 restricts recording of the music data onto the SD card 1090 by controlling the data read unit 1010, the recording unit 1070, and the recording number update unit 1040.

Under the control of the record judging unit 1020 which has judged that music data can be recorded, the recording number update unit 1040 updates information in the recording number storage unit 1030.

On receiving an instruction to record music data from the record judging unit 1020, the recording unit 1070 converts the music data into the MP3 format and writes it onto the SD card 1090. The recording unit 1070 includes a data storage unit 1071 which is memory or a hard disk.

In more detail, when recording music data written on the CD 1080 onto the SD card 1090 for the first time, the recording unit 1070 converts the music data, which has been read by the data read unit 1010 together with the corresponding ISRC, into the MP3 format, and places the converted music data and the ISRC into the data storage unit 1071. When thereafter recording the same music data onto an SD card, the recording unit 1070 reads the converted music data in the MP3 format from the data storage unit 1071, and writes it onto the SD card without performing format conversion. Note that an SD card may be replaced for each record of music data. When the number of times music data has been recorded has reached the limit on the number of recordings, that is, the current recording-is the last one, the recording unit 1070 deletes the music data and the ISRC from the data storage unit 1071 after the current recording.

The recording limit update unit 1060 receives an encrypted code inputted from the user, and updates the information in the recording limit storage unit 1050 in accordance with the encrypted code. The encrypted code refers to information, which is composed of an ISRC and a limit on the number of times music data specified by the ISRC can be copied and which is encrypted in order to protect it from being tampered with. A music company or the like sells such encrypted code to the user.

Note that functions of the data read unit 1010, the record judging unit 1020, the recording number update unit 1040, the recording limit update unit 1060, and the recording unit 1070 can be achieved by having the CPU execute an application program, which is stored in the memory of the PC and controls recording of digital data. Contents of the recording number storage unit 1030 and the recording limit storage unit 1050 are protected from being tampered with. This can be achieved by, for instance, encrypting these contents, creating copies of the encrypted contents, placing the copies into each area in the memory, and composing the above application program to be run only when all the contents of the copies are the same.

Figure 3:
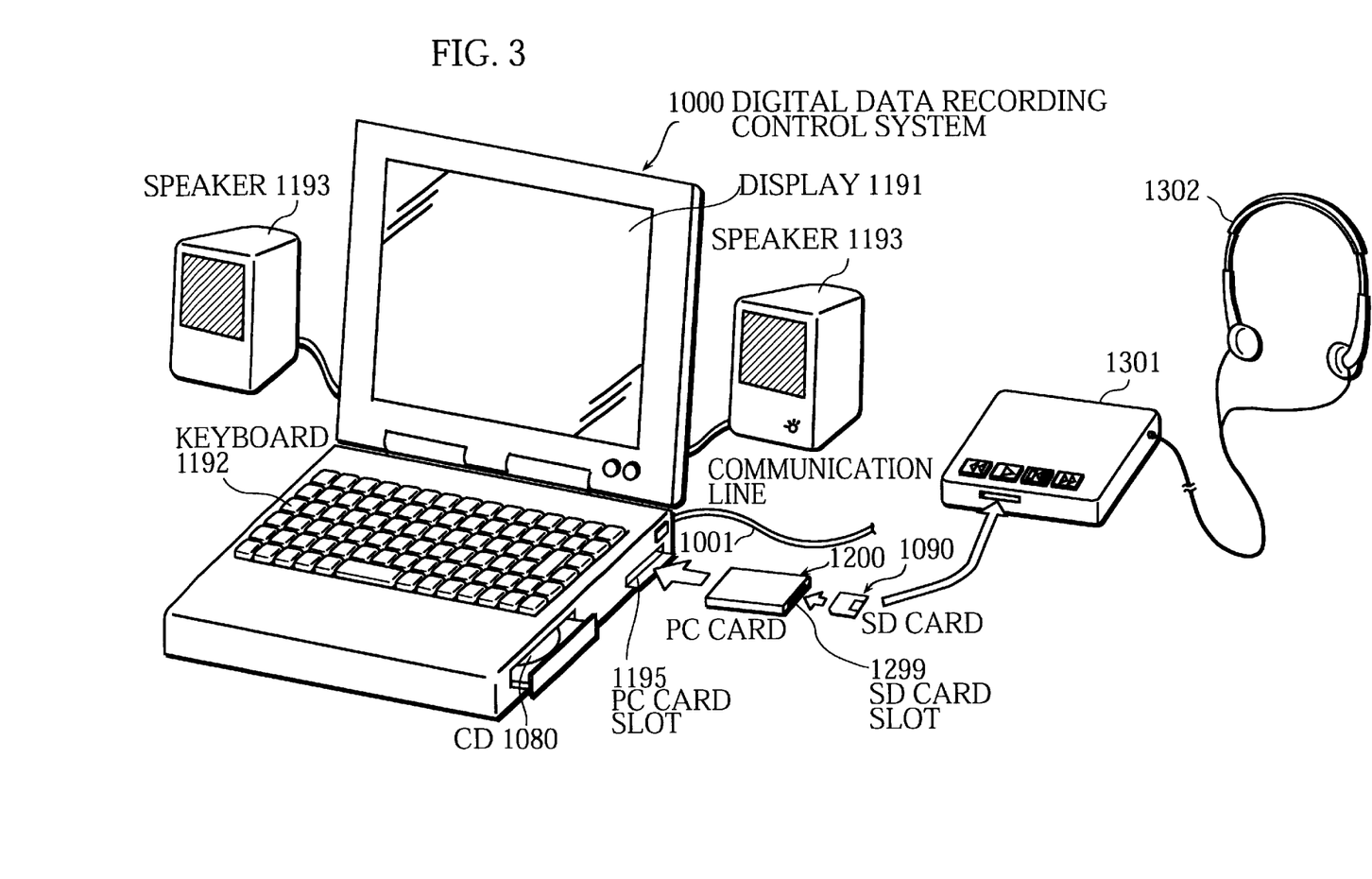
FIG. 3 shows an example external construction of the digital data recording control system 1000 and an SD card playback device 1301 that plays music, which have been recorded by the digital data recording control system 1000 onto the SD card 1090.

The following briefly explains an external construction of the digital data recording control system 1000.

FIG. 3 shows an example external construction of the digital data recording control system 1000 and an SD card playback device 1301 that plays music, which has been recorded by the digital data recording control system 1000 onto the SD card 1090.

This digital data recording control system 1000 is the PC into which the CD 1080 can be loaded, and comprises a PC card slot 1195, a display 1191, a keyboard 1192, and speakers 1193. This digital data recording control system 1000 is connected to a communication line 1001. The SD card 1090 is inserted into an SD card slot 1299 of a PC card 1200, which is inserted into the PC card slot 1195.

The SD card 1090 is an IC card, which is about two cm high×two cm wide×several mm thick and contains 64-megabyte flash memory and control circuitry.

The SD card playback device 1301 outputs music via headphones 1302 when the SD card 1090 storing music data is loaded into it.

The user records music data from the CD 1080 onto the SD card 1090, using the digital data recording control system 1000, and loads the SD card 1090 into the SD card playback device 1301 to listen to music reproduced from the music data via the headphones 1302.

Data Construction

The following describes contents of an ISRC written on the CD 1080.

The ISRC is stored in the channel Q in a CD data construction, and consists of Country Code represented by two alphabetic characters, Owner Code, which is represented by three alphanumeric characters and indicates an owner of music, Year of Recording represented by lower two digits of a recording year, and Serial Number of Recording represented by one five-digit number.

The ISRC differs according to the content of a CD. Accordingly, the same ISRC is present on different CDs, which store the same content and are mass-produced copies of the same music.

Thereafter, an ISRC will be shown by five characters representing Country Code and Owner Code, and by a seven-digit number representing Year of Recording and Serial Number of Recording, such as by "JPXXX0012345", which represents music with Serial Number "12345" released by the owner represented by "XXX" in 2000 in Japan.

Figure 4:
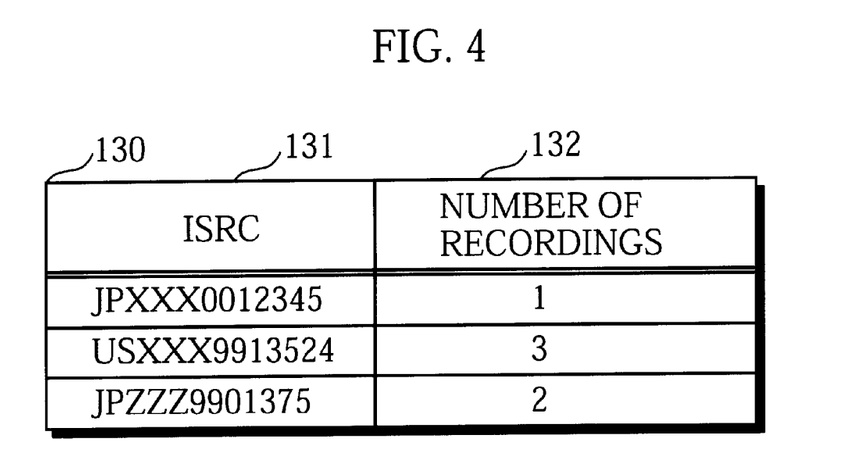
FIG. 4 shows an example construction and contents of information 130.

The following describes information stored in the recording number storage unit 1030.

FIG. 4 shows an example construction and contents of the information 130 stored in the recording number storage unit 1030. The information 130 is at least one combination of an ISRC 131 and the number of recordings 132, and is generated and updated by the recording number update unit 1040.

The ISRC 131 in each combination has been read from a CD, and the number of recordings 132 is four-byte information showing the number of times the music data specified by the ISRC 131 has been recorded onto an SD card such as the SD card 1090.

The recording number storage unit 1030 stores the information 130 whose contents are as shown in FIG. 4 when the digital data recording control system 1000 has recorded (i.e., copied) music data present on the following CDs onto SD cards the following number of times: a CD storing an ISRC "JPXXX0012345" once; a CD storing an ISRC "USXXX9913524" three times; and a CD storing an ISRC "JPZZZ9901375" twice.

Note that the information 130 does not exist when the digital data recording control system 1000 has not copied any music data yet. When the digital data recording control system 1000 copies music data written on a CD, a combination of the ISRC written on the CD and the number of times music data written on the CD has been recorded is generated as or added to the information 130.

Figure 5:
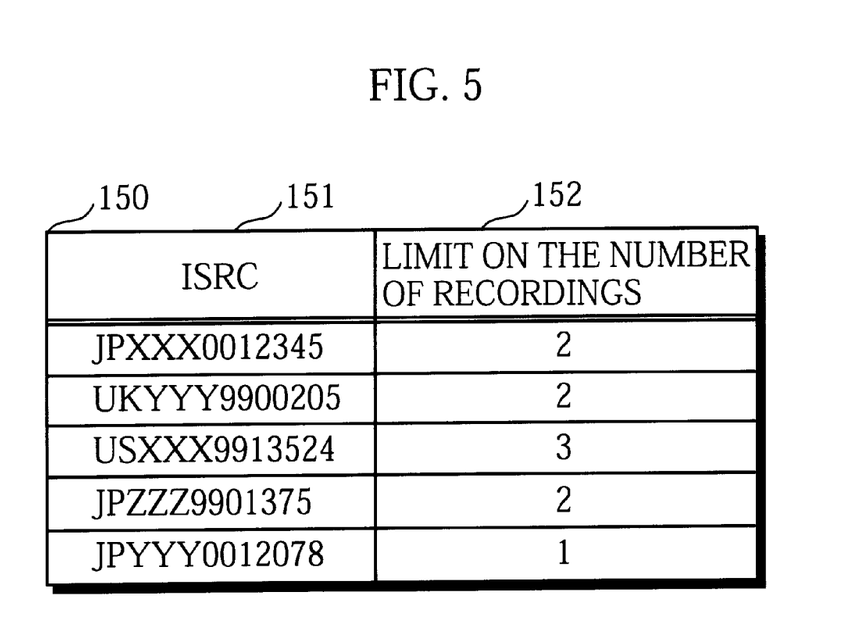
FIG. 5 shows an example construction and contents of information 150.

The following describes information in the recording limit storage unit 1050.

FIG. 5 shows an example construction and contents of information 150 in the recording limit storage unit 1050. The information 150 is at least one combination of an ISRC 151 and the limit on the number of recordings 152, and is generated and updated by the recording limit update unit 1060.

The ISRC 151 in each combination is written on a CD like the ISRC 131, and the limit on the number of recordings 152 is four-byte information showing the permitted number of times music data specified by the ISRC 151 can be copied from a CD onto an SD card such as the SD card 1090.

The information 150 whose contents are as shown in FIG. 5 shows that music data specified by ISRCs "JPXXX0012345", "UKYYY9900205", and "JPZZZ9901375" can be copied twice at most, music data specified by the ISRC "USXXX9913524" can be copied three times at most, and music data specified by the ISRC "JPYYY0012078" can be copied only once.

Operations

The following describes the processing of the digital data recording control system 1000.

Figure 6:
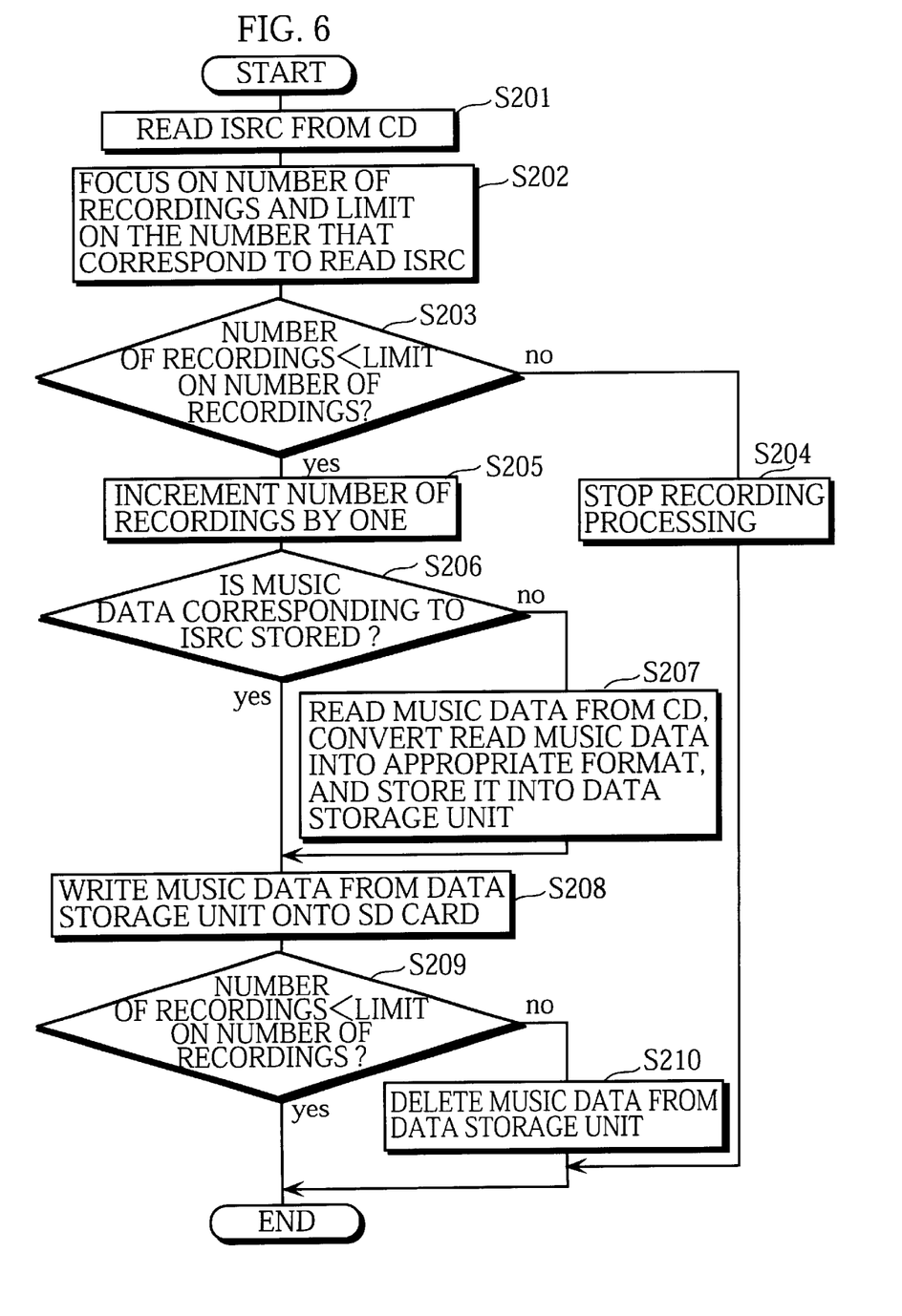
FIG. 6 is a flowchart showing recording performed by the digital data recording control system 1000.

FIG. 6 is a flowchart showing recording performed by the digital data recording control system 1000.

As shown in the chart, the digital data recording control system 1000 performs recording by executing the following steps: step S201 for reading an ISRC from a CD; step S202 for referring to the number of recordings and the limit on the number of recordings which correspond to the read ISRC; step S203 for comparing the number and the limit on the number and judging from the comparison result whether the recording can be performed; step S204 for stopping the recording; step S205 for incrementing the number of recordings; and steps S206–S210 for performing processing related to recording of music data onto an SD card.

When judging that the recording cannot be performed in step S203, the digital data recording control system 1000 performs step S204, or otherwise performs steps S205–S210.

The following describes each step in detail with reference to an example.

Assume that before the above steps are performed, the user has already paid for copying music data written on CDs to obtain encrypted codes, and inputted the encrypted codes via the keyboard to the PC that is the digital data recording control system 1000, so that the recording limit storage unit 1050 stores the information 150 shown in FIG. 5. The recording number storage unit 1030 stores no information as the digital data recording control system 1000 has not performed any recording yet.

When the user has loaded the CD 1080 into the CD reader in the PC, and instructed to record music data from the CD 1080 onto the SD card 1090 via the keyboard 1192 or the like, the system 1000 operates as follows.

On receiving the instruction, the data read unit 1010 reads the ISRC from the CD 1080 (step S201). Assume that the read ISRC is "JPXXX0012345".

The record judging unit 1020 then refers to information in the recording number storage unit 1030 and the recording limit storage unit 1050 to find the number of recordings and the limit on the number of recordings that correspond to the read ISRC (step S202). The record judging unit 1020 then judges whether recording can be performed by recognizing if the recording number is lower than the limit (step S203). Note that if the limit corresponding to the read ISRC does not exist in the recording limit storage unit 1050 and so has not been found in step S202, the record judging unit 1020 regards the limit as "0" and then makes the judgement in step S203. Similarly, if the number of recordings corresponding to the read ISRC does not exist in the recording number storage unit 1030 and so has not been found in step S202, the record judging unit 1020 regards the number of recordings as "0" and then makes the judgement in step S203.

For the ISRC "JPXXX0012345", the number of recordings "0" is found together with the limit on the number of recordings "2" (see FIG. 5) as no information exists in the recording number storage unit 1030. Accordingly, the record judging unit 1020 judges that recording can be performed.

After giving the "Yes" judgement (step S203), the record judging unit 1020 has the recording number update unit 1040 increment the number of recordings corresponding to the read ISRC by one (step S205).

For the above example, no recording number information has been stored yet in the recording number storage unit 1030, and so the recording number update unit 1040 associates the ISRC "JPXXX0012345" with the number of recordings "1" as one combination, and places the combination into the recording number storage unit 1030.

Following this, the record judging unit 1020 instructs the recording unit 1070 to record music data corresponding to the ISRC, and the recording unit 1070 judges if the data storage unit 1071 stores this music data (step S206). If not, the recording unit 1070 has the data read unit 1010 read the music data from the CD 1080, converts the read music data into the MP3 format, and places it into the data storage unit 1071 together with the ISRC (step S207). For the above example, music data and the ISRC "JPXXX0012345" are stored after having been associated with one another in the data storage unit 1071.

On judging that the data storage unit 1071 stores the music data for the ISRC in step S206, or on performing step S207, the recording unit 1070 writes the music data stored in the data storage unit 1071 onto the SD card 1090 (step S208).

Following this, the recording unit 1070 refers to information in the recording number storage unit 1030 and the recording limit storage unit 1050, and judges if the number of recordings associated with the current ISRC (i.e., "JPXXX0012345" for the above example) is lower than the limit on the number of recordings for the ISRC (step S209). If not, which means that the music data can no longer be recorded, the recording unit 1070 deletes the music data and the ISRC from the data storage unit 1071 (step S210), and the recording is completed. If the number of recordings is judged as lower than the limit in step S209, the recording is completed without performing step S210.

For the ISRC "JPXXX0012345", step S210 will not be performed as the number of recordings for the ISRC is "1", which is lower than the limit "2" for the ISRC. As a result, the data storage unit 1071 remains to store the music data in the MP3 format specified by the ISRC "JPXXX0012345".

Following this, assume that the user has replaced a CD and an SD card several times, and the digital data recording control system 1000 has recorded music data written on a CD onto an SD card several times in response to user instructions. Also, assume that the user has now instructed to copy music data written on the CD 1080 storing the ISRC "JPXXX0012345" onto the SD card 1090, and the recording number storage unit 1030 currently stores the information 130 shown in FIG. 4. As a result, the digital data recording control system 1000 performs the following operations.

When the user loads the CD 1080 storing the ISRC "JPXXX0012345" into the CD reader in the PC (i.e., the digital data recording control system 1000) and instructs to copy the music data via the keyboard 1192 or the like, the data read unit 1010 has the CD reader read the ISRC from the CD 1080 (step S201). The record judging unit 1020 refers to information in the recording number storage unit 1030 and the recording limit storage unit 1050 to find the number of recordings and the limit on the number of recordings that are associated with the read ISRC (step S202). The record judging unit 1020 then judges whether the recording of the music data can be performed by recognizing if the recording number is lower than the limit (step S203). For the ISRC "JPXXX0012345", the number of recordings is "1" (see FIG. 4), and the limit on the number is "2" (see FIG. 5). Therefore, the record judging unit 1020 judges that the recording can be performed.

After giving the "Yes" judgement (step S203), the record judging unit 1020 has the recording number update unit 1040 increment the number of recordings for the ISRC by one to "2" (step S205), and instructs the recording unit 1070 to record the music data specified by the ISRC. The recording unit 1070 then judges if the data storage unit 1071 stores the music data associated with the ISRC "JPXXX0012345" (step S206). As this is the case, the recording unit 1070 skips step S207 and writes the music data in the data storage unit 1071 onto the SD card 1090 (step S208).

Following this, the recording unit 1070 refers to information in the recording number storage unit 1030 and the recording limit storage unit 1050, and judges if the number of recordings associated with the ISRC "JPXXX0012345" is lower than the limit on the number (step S209). As the recording number "2" for the ISRC "JPXXX0012345" is equal to the limit, the recording unit 1070 gives the "No" judgement, and deletes the ISRC and the associated music data from the data storage unit 1071 (step S210). This completes the music data recording.

After this, if the user instructs to copy a CD storing the same music again, the digital data recording control system 1000 performs the following processing.

The data read unit 1010 reads the ISRC "JPXXX0012345" from the CD 1080 (step S201), and the record judging unit 1020 finds "2" as both the number of recordings and the limit on the number for the read ISRC (step S202). As the recording number is not lower than the limit, the record judging unit 1020 judges that recording for the music data can no longer be performed (step S203), and so stops the recording by prohibiting execution of steps S205–S210 (step S204). This completes the music data recording.

Note that the record judging unit 1020 may perform operations such as displaying an error message on the display 1191 when it stops recording in step S204.

In this way, the digital data recording control system 1000 reads music data from the CD 1080 and writes it onto the SD card 1090 within the limit on the number of recordings for the music data.

Supplementary Explanation

The digital data recording control system 1000 of the above embodiment has been used to describe the digital data processing device of the present invention although it should be clear that the present invention is not limited to this embodiment. Possible modifications are described below.

1. The above embodiment describes the digital data recording control system 1000 that restricts the copying of music data written on a CD onto an SD card, although the copying of other forms of data may be restricted. The recording medium from which data is to be copied is not limited to a CD, the recording medium onto which a copy is recorded is not limited to an SD card, and music data does not have to be converted into another format, such as MP3, when it is recorded onto a recording medium.

This is to say, the digital data recording control system 1000 may copy other types of a copyrighted digital production. The present invention may be used to restrict the number of recordings by a system that reads audio and image data from a DVD-ROM (Digital Versatile Disc) and records the data onto hard disk, or by a system that reads music data written on an MD and records it onto an SD card. Also, instead of converting data when it is recorded onto a recording medium, the data may be directly copied onto the recording medium.

When recording data such as music data onto hard disk in a PC, the present digital data processing device may prevent the data in the hard disk from being copied by deleting the data from the hard disk as soon as the data is written onto another recording medium.

2. In the above embodiment, a PC is used as the digital data recording control system 1000 although the present invention may be used by other devices capable of executing programs such as an AV (audio-video) apparatus or a home electrical appliance.

3. It is not necessary to store all the data for an ISRC written on a CD into the recording number storage unit 1030 and the recording limit storage unit 1050, and instead only parts of the ISRC may be stored into the units 1030 and 1050.

4. In the above embodiment, the ISRC which specifies the music data written on a CD is associated with the music and stored into the recording number storage unit 1030. However, instead of the ISRC, it is possible to use other ID information that specifies a copyrighted digital production on a recording medium; this information may be recorded within or alongside digital productions.

Instead of the above ID information (hereafter content-ID information) that specifies the content of a recording medium, medium-ID information specifying a recording medium may be used if present on a recording medium. In this case, medium-ID information may be associated with a number of times digital data stored on the recording medium has been recorded, and stored in the recording number storage unit 1030.

This is to say, the present invention may manage the number of recordings and restrict the recording, using either medium-ID information that specifies a recording medium, or content-ID information that specifies the content of the recording medium. When content-ID information is used, the number of times to record the content specified by the content-ID information can be restricted regardless of the recording medium on which the content is stored. On the other hand, when medium-ID information is used, the number of recordings can be restricted according to the particular recording medium specified by the medium-ID information.

The above content-ID information may be part of digital data stored on a recording medium, such as the first few hundred bytes of digital data.

When one recording medium stores separate units of copyrighted material, like a music CD storing different songs, an ID or other unique information for each song may be associated with the above ISRC and number of times the song has been recorded, and may be stored in a PC. This enables the PC to control recording for each unit stored on one recording medium. For instance, if one recording medium stores a plurality of copyrighted digital productions as a plurality of sets of data together with IDs or the like that each specify a digital production, the copying of each digital production can be controlled according to the number of times the production has been copied.

5. The above embodiment states that the information 130 and 150 are stored in memory regions and the power of the PC is always on. However, the PC power may only be on during operation, and the information 130 and 150 may be stored in non-volatile memory or auxiliary storage such as a hard disk.

6. In the above embodiment, the recording limit storage unit 1050 stores the limit on the number of recordings for each ISRC, although the unit 1050 may store only one limit in advance which cannot be updated. In this case, the recording limit update unit 1060 is not necessary. This is to say, a single limit on the number of recordings may be set commonly for all recording media such as CDs.

When the fixed limit "1" is set, the recording number storage unit 1030 does not have to store the number of recordings, and therefore may store only ISRCs. In this case, an ISRC may be registered into the recording number storage unit 1030 when music data specified by the ISRC is recorded from a CD onto another recording medium. Music data whose ISRC is stored in the unit 1030 can no longer be recorded onto another recording medium.

7. In the above embodiment, the recording limit update unit 1060 updates the information 150 in the recording limit storage unit 1050 in accordance with an encrypted code inputted from the user. However, a limit on the number of recordings may alternatively be written in advance on a recording medium, such as a CD, that stores digital data, and the recording limit update unit 1060 may have the data read unit 1010 read this limit from the recording medium and perform the update in accordance with the read limit.

8. In the above embodiment, recording of music data from a CD onto an SD card is restricted based on the number of recordings although other methods may be alternatively used to restrict use of the music data. For instance, reproduction of music data written on a recording medium, such as by using the speakers 1193 shown in FIG. 5, may be restricted by setting the limit on the number of times the music data can be reproduced. It is alternatively possible to set the limit on the number times music data written on a recording medium can be read, regardless of whether the music data is reproduced or recorded, to restrict read and/or use of the music data. It is alternatively possible to set a separate limit on the number of recordings and the number of plays to separately restrict recording and playing.

For instance, the limit on the number of plays "3" may be set in advance for a free sample music CD, and the limit on the number of recordings (i.e., copying) may be set later in accordance with a charge payed by the user for the copying. This allows the user to listen to music on the sample CD three times at most and to purchase the rights to copy the music if further listenings are desired.

9. When the number of recordings has become the same as the limit on the number as a result of the incrementing in step S205, the number of recordings, the limit, and the associated ISRC may be deleted from the recording number storage unit 1030 and the recording number update unit 1040. Also, a certain ISRC in the recording limit storage unit 1050 may be associated with a valid period, and when the valid period expires, a limit and a number of recordings which correspond to the certain ISRC, and the ISRC may be deleted.

10. In the above embodiment, the recording number update unit 1040 increments the number of recordings by one (step S205) when music data is read from a CD (step S207). However, it is alternatively possible to use only the limit on the number of recordings and to decrement the value of the limit by one in step S205 instead of incrementing another number. In this case, the record judging unit 1020 judges in step S203 that recording can be performed if the limit is "1" or higher. In this way, the limit on the number of recordings gives an indirect indication of the number of recordings, with a limit value that has not been decremented corresponding to the number of recordings "0".

After an ISRC has been set in the recording limit storage unit 1050, the number of recordings "0" may be generated for the ISRC and placed in the recording number storage unit 1030 even before music data specified by the ISRC is read from a CD.

11. In the above embodiment, the digital data recording control system 1000 converts music data before storage into the data storage unit 1071 when recording the music data written on a CD onto an SD card for the first time, and uses the converted music data in the data storage unit 1071 to thereafter record the music data onto an SD card. However, the data storage unit 1071 may be omitted from the system 1000 and the music data can be read from a CD and converted into an appropriate format for recording onto an SD card whenever the user wishes to record the music data.

In the above embodiment, the record judging unit 1020 has the data read unit 1010 read an ISRC indicated by the user from a CD, and makes the judgement in step S203 based on this ISRC. However, once music data has been read from a CD and written in the data storage unit 1071 for recording onto an SD card, the record judging unit 1020 may make the judgement in step S203 based on an ISRC which has been stored in the data storage unit 1071 together with the music data. This allows the digital data recording control system 1000 to write music data stored in the data storage unit 1071 onto an SD card without the user needing to load a CD storing the music data, provided the number of recordings has not reached the predetermined limit.

12. The recording procedure shown in FIG. 6 of the digital data recording control system 1000 may be achieved by computer-readable programs that are executed by general-purpose computers, home electronic appliances, or the like. These programs may be distributed and sold by recording them on recording media or by sending them via a communication line. These recording media can be IC cards, optical discs, flexible discs, ROMs, or other media, with the programs recorded on the media being installed into devices, such as general-purpose computers and home electronic appliances. These devices execute the installed programs, thereby realizing the digital data recording control system 1000 of the above embodiment.

What is claimed is:

1. A digital data processing device for reading content data from a first recording medium having the content data and ID (identification) information, and using the read content data, the digital data processing device comprising:

a limit information storage unit for storing limit information showing a limit on a number of times the content data is permitted to be used:

a use information storage unit that has a storage region capable of storing a combination of the ID information present on the first recording medium and use information showing a number of times the content data has been used;

an ID information reading unit for reading the ID information from the first recording medium;

a use judging unit for referring to said use information storage unit to obtain the use information that is in the same combination as the read ID information, comparing the number of times in the obtained use information with the limit in the limit information, and judging whether usage of the content data is permitted based on a comparison result, wherein when the read ID information does not exist in said use information storage unit, said use judging unit assumes that use information, which would be in a same combination as the read ID information, shows the number of times as zero, and obtains the use information showing the number of times as zero; and a content data using unit for using the content data if said use judging unit judges that the usage of the content data is permitted, and updating the use information each time the content data is used, wherein when the read ID information does not exist in said use information storage unit, said content data using unit, instead of performing an update, places a combination of the read ID information, and the use information, which shows the number of times the content data has been used as one, into said use information storage unit.

2. The digital data processing device of claim 1, wherein said content data using unit includes a recording unit for accessing a second recording medium to write data, and uses the content data by having said recording unit write the content data onto the second recording medium.

3. The digital data processing device of claim 2, wherein the ID information stored on the first recording medium specifies the content data present on the first recording medium.

4. The digital data processing device of claim 1, wherein the limit in the limit information corresponds to the ID information and shows the limit on the number of times the content data, which is present on the first recording medium together with the ID information, is permitted to be used, and wherein said use judging unit compares the number of times in the use information with the limit corresponding to the read ID information, and judges that the usage of the content data is permitted when the number of times in the use information is smaller than the limit.

5. The digital data processing device of claim 1, wherein the use information is expressed as a number, and wherein said content data using unit updates the use information by incrementing the number by one, and when the incremented number of times becomes equal to the limit in the limit information, said content data using unit deletes a combination containing the updated use information from said use information storage unit and updates the limit to zero.

6. The digital data processing device of claim 1, wherein the first recording medium is read-only.

7. The digital data processing device of claim 1, wherein the content data is at least one of audio data and image data.

8. The digital data processing device of claim 3, wherein the content data is audio data, wherein the first recording medium is a compact disc, and wherein the ID information is an ISRC (International Standard Recording Code).

9. The digital data processing device of claim 2, wherein the ID information present on the first recording medium distinguishes the first recording medium from other recording media.

10. The digital data processing device of claim 2,
wherein the content data is divided into a plurality of sets of partial content data,
wherein the ID information contains a plurality of sets of part-ID information, each of the sets of part-ID information specifying a different set of the sets of partial content data,
wherein said ID information reading unit reads a set of the sets of part-ID information specifying a set of the sets of partial content data, and
wherein said use judging unit judges whether usage of the set of partial content data specified by the read set of part-ID information is permitted.

11. The digital data processing device of claim 2,
wherein the limit in the limit information corresponds to the ID information and shows the limit on the number of times the content data, which is present on the first recording medium together with the ID information, is permitted to be used, and
wherein said use judging unit compares the number of times in the use information with the limit corresponding to the read ID information, and judges that the usage of the content data is permitted when the number of times in the use information is smaller than the limit.

12. The digital data processing device of claim 2,
wherein the first recording medium is read-only.

13. The digital data processing device of claim 2, wherein the content data is at least one of audio data and image data.

14. The digital data processing device of claim 1,
wherein the content data is at least one of audio data and image data, and
wherein said content data using unit includes a reproducing unit for reproducing at least one of sounds and images from the at least one of the audio data and the image data, and using the content data by having said reproducing unit reproduce the at least one of the sounds and the images from the content data.

15. The digital data processing device of claim 14,
wherein the ID information stored on the first recording medium specifies the content data present on the first recording medium.

16. The digital data processing device of claim 14,
wherein the ID information present on the first recording medium distinguishes the first recording medium from other recording media.

17. A digital data processing method for having a computer read content data from a recording medium having the content data and ID information, and use the read content data, the computer including a storage unit for storing limit information showing a limit on a number of times the content data is permitted to be used, the digital data processing method comprising:
storing in the storage unit, a combination of the ID information present on the recording medium, and use information showing a number of times the content data has been used;
reading the ID information from the recording medium;
a use judging operation of referring to the storage unit to obtain the use information that is in the same combination as the read ID information, comparing the number in the obtained use information with the limit in the limit information, and judging whether usage of the content data is permitted based on a comparison result,
wherein when the read ID information does not exist in the use information storage unit, said use judging operation further comprises assuming that use information, which would be in a same combination as the read ID information, shows the number of times as zero, and obtaining the use information showing the number of times as zero; and
a content data using operation of using the content data if the usage of the content data is judged to be permitted in said use judging operation, and updating the use information each time the content data is used,
wherein when the read ID information does not exist in the use information storage unit, said content data using operation further comprises placing, instead of performing said updating, a combination of the read ID information, and the use information, which shows the number of times the content data has been used as one, into the use information storage unit.

18. A control program stored on a computer-readable recording medium for having a computer perform digital data use processing by having the computer read content data from a second recording medium having the content data and ID information, and use the read content data, the computer including a storage unit for storing limit information showing a limit on a number of times the content data is permitted to be used, the digital data use processing comprising:
storing in the storage unit, a combination of the ID information present on the second recording medium, and use information showing a number of times the content data has been used;
reading the ID information from the second recording medium;
a use judging operation of referring to the storage unit to obtain the use information that is in the same combination as the read ID information, comparing the number in the obtained use information with the limit in the limit information, and judging whether usage of the content data is permitted based on a comparison result,
wherein when the read ID information does not exist in the use information storage unit, said use judging operation further comprises assuming that use information, which would be in a same combination as the read ID information, shows the number of times as zero, and obtaining the use information showing the number of times as zero; and
a content data using operation of using the content data if the usage of the content data is judged to be permitted in said use judging operation, and updating the use information each time the content data is used,
wherein when the read ID information does not exist in the use information storage unit, the content data using operation further comprises placing, instead of performing said updating, a combination of the read ID information, and the use information, which shows the number of times the content data has been used as one, into the use information storage unit.

* * * * *